United States Patent [19]

Timmermann et al.

[11] Patent Number: 5,644,020
[45] Date of Patent: Jul. 1, 1997

[54] THERMOPLASTICALLY PROCESSIBLE AND BIODEGRADABLE ALIPHATIC POLYESTERAMIDES

[75] Inventors: Ralf Timmermann, Krefeld; Ralf Dujardin, Willich; Rainhard Koch, Köln, all of Germany

[73] Assignee: Bayer Aktiengesellschaft, Leverkusen, Germany

[21] Appl. No.: 644,584

[22] Filed: May 10, 1996

Related U.S. Application Data

[63] Continuation of Ser. No. 283,528, Aug. 1, 1994, abandoned.

[30] Foreign Application Priority Data

Aug. 12, 1993 [DE] Germany .............. 43 27 024.7

[51] Int. Cl.$^6$ .............. C08G 63/44; C08G 69/44
[52] U.S. Cl. .............. 528/288; 528/272; 528/291; 528/292; 528/302; 528/310; 528/324; 528/332; 528/335; 528/361; 525/437; 525/450
[58] Field of Search .............. 528/272, 288, 528/291, 292, 302, 310, 324, 332, 335, 361; 525/437, 450

[56] References Cited

U.S. PATENT DOCUMENTS

| 4,343,931 | 8/1982 | Barrows . |
| 4,380,622 | 4/1983 | Chiba et al. .............. 528/288 |

FOREIGN PATENT DOCUMENTS

| 0030822 | 6/1981 | European Pat. Off. . |

OTHER PUBLICATIONS

Japanese J5 4119-593 (1979) (Abstract Only).
Japanese J5 4119-594 (1979) (Abstract Only).
Japanese J5 4119-595 (1979) (Abstract Only).
Japanese JP 56022324 (1980) (Abstract Only).

Primary Examiner—Samuel S. Acquah
Attorney, Agent, or Firm—Connolly and Hutz

[57] ABSTRACT

The invention relates to thermoplastically processible aliphatic polyesteramides which are biodegradable (compostable).

7 Claims, No Drawings

THERMOPLASTICALLY PROCESSIBLE AND BIODEGRADABLE ALIPHATIC POLYESTERAMIDES

This application is a continuation, of application Ser. No. 08/283,528 filed on Aug. 1, 1994, now abandoned.

The invention relates to thermoplastically processible aliphatic polyesteramides which are biodegradable (compostable).

It is known that aliphatic polyesters are very readily biodegradable. However, they are low-melting (50° to 70° C.) waxes without adequate mechanical properties.

On the other hand, there are industrial polyamide (e.g. PA 6 and 66) materials which have very good mechanical properties but which are generally not biodegradable. (S. Huang, Biodegradation in Comprehensive Polymer Science, vol. 6, chap. 21, Pergamon Press, Oxford 1989).

Polyesteramide copolymers are known in principle (Polyesters in Encyclopedia of Polymer Science and Engineering, 2nd ed., Wiley & Sons, New York, vol. 12, p. 59/60).

Their major application is hot-melt adhesives. These are materials which are optimised by incorporating special long-chain carboxylic acids, e.g. dimeric fatty acids or mixtures of cycloaliphatic diamines to produce low melting points and delayed crystallisation (e.g. EP 0 027 944). They have no mechanical properties at all which are suitable for producing items of practical use. In addition, they are not biodegradable.

Biodegradable polyesteramides based on natural amino acids have also been described. However, they do not have any of the mechanical properties which are required to produce items of practical use. Furthermore, their preparation via a costly protective group technique, since they are generally natural amino acids combined with hydroxycarboxylic acids, is very complicated. The molecular weights reached by these polymers are not particularly high and seldom exceed 10 000 [Polym. Bull. 28 (1992) 301–307]. J. Appl. Polym. Sci. (1979) 1701–1711 describes the synthesis of copolyamidesters by blending polyamide 6 and polycaprolactone. The degradation of these materials is described, but no mechanical data are given. Ester interchange between these two polymers takes place only very slowly and is not complete. This method of preparation is therefore not suitable for the production of thermoplastic materials with reproducible properties. J. Appl. Polym. Sci. 27 (1982) 1809–1822 describes aliphatic polyesteramides which are prepared via acid chlorides, a diol and a diamine. This method of preparation is very complicated. There is no reference to biodegradability or compostability.

EP 0 069 475 describes the synthesis of aliphatic polyesteramides from diols, dicarboxylic acids and amide-forming components. The chain-length of the dicarboxylic acids used is 9 to 12 carbon atoms, that of the aminocarboxylic acids is 11 or 12 and of the dicarboxylic acids for the salt is 9 to 12 carbon atoms. There are no references to possible degradation.

Biodegradable poly(ester/amides) from lactic acid, diamines and dicarboxylic acid dichlorides (U.S. Pat. Nos. 4 343 931; 4 529 792) or from caprolactone and caprolactam (Jap. Pat. 79 119 593, Jap. Pat. 79 119 594) are also known, but they are costly to produce.

The preparation of poly(ester/amides) by reacting acid-terminated aliphatic ester prepolymers with aromatic diisocyanates is known (see for example U.S. Pat. No. 4 129 715, EP 0 275 988). However, it is not disclosed whether these materials are biodegradable.

The main problem with the polyesteramides described, in addition to their occasional lack of degradability and very expensive methods of synthesis, is the relatively low molecular weight which is obtained. Relative viscosities measured as 0.5 wt. % strength solutions of these polymers in m-cresol of higher than 2.0 have not hitherto been described. These molecular weights are definitely required, however, in order to achieve good mechanical properties and for processing, e.g. to give blown films.

Surprisingly, it has now been found that polyesteramides with high molecular weights and with ester contents between 30 and 70 wt. % can be easily and reproducibly produced and that they also have good mechanical properties, even for the production of transparent films, and good biodegradability or compostability.

This is all the more surprising since biodegradation depends on molecular weight and should become increasingly poorer with increasing molecular weight (Kinoshita et al., Agric. Biol. Chem. 39 (1975) 1219). In our case, however, even very high molecular weight polyesteramides with low proportions of ester still lead to very good biodegradation.

The invention provides compostable thermoplastic macromolecular weight copolymers which are characterised in that they contain aliphatic ester and aliphatic amide structures and melting points of at least 75° C., the proportion by weight of ester structures being between 30 and 70% and the proportion of amide structures being between 70 and 30%.

Copolymers according to the invention have an average molecular weight ($M_w$, determined by gel chromatography in m-cresol against Standard polystyrene) of 10 000 to 300 000, preferably 20 000 to 150 000.

1 g of the copolymers according to the invention, in 250 ml of ASTM nutrient solution at a pH of 6.8, inoculated with 2 ml of an extract from garden compost and rotated at 220 rpm at 37° C. with the introduction of air, caused a growth of biomass of at least 30 g/l within a maximum of two weeks and under the same conditions showed a weight loss of at least 10 wt. % within a maximum of four weeks.

The polyesteramides according to the invention are synthesised by mixing the amide- or ester-forming starting components and polymerising at elevated temperature under their inherent pressure and subsequently distilling off the water of reaction and excess monomers under vacuum at elevated temperature.

Although materials based on modified natural products sometimes demonstrate good biodegradability, they generally do not have good mechanical properties, e.g. cellulose. To achieve thermoplastic processing and good mechanical properties, however, additives, even polymers, are normally used, which makes complete biodegradability difficult.

A person skilled in the art finds it very surprising that polymers with such high melting points still demonstrate such good biodegradation. The variation of biodegradation with the melting point of polymers is tested in ACS Symp. Ser. 433 (1990) p. 136–148. It was found that polymers with a melting point higher than 75° C. no longer demonstrated any noticeable degradation. The polymers described in the present invention, however, have melting points which are well above this experimental limit and demonstrate very good biodegradation.

The arrangement of ester or amide segments takes place purely statistically, simply due to the conditions of synthesis, i.e. these compounds should not be called thermoplastic elastomers but thermoplasts.

The structure of thermoplastic elastomers is described in the specialist literature as "the simultaneous presence of flexible and elastic segments with high elasticity and a low glass transition temperature (Tg value) and rigid and crystallisable segments with low elasticity, high Tg value and the tendency to form associates (cross-linking)" (W. Hofmann, "Thermoplastische Elastomere—Stoffklassen und Versuch einer Klassifikation", Kunststoffe 77 (1987) 767–776.

This arrangement of segments is not produced.

It is true that block copolymers with ester and amide structures which have the composition according to the invention are also compostable. Their synthesis, however, is much more costly (Castaldo et al., J. Appl. Polym. Sci. 27 (1982) 1809–1822).

The monomers used in the synthesis according to the invention can be drawn from of the following groups:

dialcohols such as ethylene glycol, 1,4-butanediol, 1,3-propanediol, 1,6-hexanediol, diethylene glycol, etc.

and/or dicarboxylic acids such as oxalic acid, succinic acid, adipic acid, etc., also each may be in the form of its ester (methyl, ethyl, etc.)

and/or hydroxycarboxylic acids and lactones such as caprolactone, etc.

and/or aminoalcohols such as ethanolamine, propanolamine, etc.

and/or cyclic lactams such as ε-caprolactam or lauric lactam, etc.

and/or ω-aminocarboxylic acids such as aminocaproic acid, etc.

and/or contain mixtures (1:1 salts) of dicarboxylic acids such as adipic acid, succinic acid etc. and diamines such as hexamethylenediamine, diaminobutane, etc.

Hydroxy-terminated or acid-terminated polyesters with molecular weights between 200 and 10 000 may also be used as the ester-forming compound.

Synthesis may take place either by the "polyamide method" by stoichiometrically mixing the starting compounds, optionally with the addition of water and subsequent removal of water from the reaction mixture, or by the "polyester method" by adding an excess of diol with esterification of the acid groups and subsequent transesterification or transamidation of these esters. In the second case, the excess of glycol is again distilled also off as well as the water.

Caprolactam, a diol and a dicarboxylic acid are preferably mixed in the desired stoichiometry.

Furthermore, the polyesteramides according to the invention may contain 0.1 to 5 wt. %, preferably 0.1 to 2 wt. % of branching agents. These branching agents may be e.g. trifunctional alcohols such as trimethylolpropane or glycerol, tetrafunctional alcohols such as pentaerythritol or trifunctional carboxylic acids such as citric acid. The branching agent increases the fusion viscosity of the polyesteramides according to the invention to an extent that extrusion blow moulding is possible using these polymers. The biodegradation of these materials is not thereby hindered.

Aliphatic polyesteramides according to the invention have proportions of ester between 35 and 80 wt. %, containing aliphatic dialcohols with a chain length of $C_2$–$C_{12}$, preferably $C_2$–$C_6$, aliphatic dicarboxylic acids or their esters with a chain length of $C_2$–$C_{12}$, preferably $C_2$–$C_6$, ω-aminocarboxylic acids with a chain length of $C_1$–$C_{12}$, preferably $C_4$–$C_6$ or cyclic lactams with a ring size of $C_5$–$C_{12}$, preferably $C_6$–$C_{11}$ or a 1:1 salt of an aliphatic dicarboxylic acid and an aliphatic diamine with a chain length of $C_4$–$C_{12}$, preferably $C_4$–$C_6$, with optionally 0.01 to 5 wt. %, preferably 0.01 to 2 wt. % of branching agent. They have a melting point higher than 75° C. and a molecular weight $M_w$>30 000.

The growth of biomass on the polymers amounts to at least 30 mg/l within 2 weeks.

During preparation, the amide- or ester-forming starting components are mixed together and polymerised at elevated temperature optionally under their inherent pressure and the water of reaction and excess monomers are distilled off under vacuum at elevated temperature.

The aliphatic polyesteramides have proportions of ester between 35 and 65, particularly preferably between 35 and 55 wt. % of aliphatic polyester.

The aliphatic polyesteramides preferably have caprolactam as a cyclic lactam and 1,4-butanediol and adipic acid as ester-forming components.

The aliphatic polyesteramides may be prepared from the 1:1 salt of an aliphatic dicarboxylic acid and aliphatic diamines, preferably "AH salt" from adipic acid and 1,6-hexamethylenediamine.

Preferred aliphatic polyesteramides contain 6-aminohexanoic acid as the aminocarboxylic acid unit.

The aliphatic polyester amides may contain from 0 to 50 wt. % of inorganic or organic fillers or reinforcing substances, mineral fillers, UV stabilisers, anti-oxidants, pigments, dyes, nucleating agents, crystallisation accelerators or retarders, flow agents, lubricants, mould release agents, flame retarding agents and modified or unmodified rubber as additives.

The aliphatic polyesteramides may be used to prepare biodegradable or compostable moulded items, such as films, fibres or injection moulded items and as release agents, plasticisers, coating materials, adhesives, etc.

Furthermore, polycondensation may be accelerated by using known catalysts. Both known phosphorus compounds which accelerate polyamide synthesis or acid catalysts and salts such as oxides, acetates of Mg, Zn, Ca etc., for esterification and also combinations of the two are possible for accelerating polycondensation.

The catalysts, though, must not have an effect on compostability.

Furthermore, polycondensation may be affected by the use of lysine or lysine derivatives which both accelerate condensation and also lead to branched products (see DE 3 831 709 for accelerating polyamide condensation by means of lysine and lysine derivatives).

The compostable thermoplastically processible plastics according to the invention may be provided with conventional additives such as, for example, plasticisers, impact strength modifiers, flame retardants, water repellents, nucleating agents and/or other agents, wherein in the case of compostable materials, care should be taken that the compostability is not adversely affected.

The thermoplastically processible polyesteramides according to the invention may be filled with fillers, either on their own or when treated with the additives mentioned, wherein in the case of compostable materials, care should also be taken that the compostability is not adversely affected by these additives. Talc, for example, is suitable.

Copolymers according to the invention may be processed to give, for example, films and advantageously used as compostable refuse sacks or opaque films. They may also be injection moulded in the conventional way to give moulded items which can be composted after use.

Use as coating materials, e.g. on paper or cellulose-matting and as an adhesive or glue, e.g. in laminates, is also possible. Use as a release agent, plasticiser and similar applications is also possible.

Further opportunities for use are likely in the fibre and filament sector.

EXAMPLES

The property of biodegradability or compostability according to the invention is defined as follows:

The polymers being tested are incubated at 37° C. in a liquid medium according to ASTM G22 (Composition Table 1) with a mixture of microorganisms from garden compost with rotation (220 rpm) and the introduction of air. About 1 g of the polymer, in pieces with areas of several cm², in 250 ml of nutrient solution in a 1 l conical flask is inoculated with 2 ml of a suspension of 10 g of garden compost in 100 ml of nutrient solution. Coarse particles are first removed from the compost suspension on a fine sieve. The dry substance (DS) content of the amount being added is then ca. 50 mg. As a control to measure the abiotic weight loss of the polymer sample, one batch is treated with $HgCl_2$ (500 mg/l). Further control batches contain cellulose (4 g/l, type DP 500, from Wolff Walsrode) to check the growth with a natural substrate or are set up without adding a source of carbon in order to determine the background growth and the DS decrease of the inoculum.

TABLE 1

| Composition of the nutrient solution according to ASTM G22 | |
|---|---|
| $KH_2PO_4$ | 0.7 g |
| $K_2HPO_4$ | 0.7 g |
| $MgSO_4.7H_2O$ | 0.7 g |
| $NH_4NO_3$ | 1.0 g |
| NaCl | 0.005 g |
| $FeSO_4.7H_2O$ | 0.002 g |
| $ZnSO_4.7H_2O$ | 0.002 g |
| $MnSO_4.H_2O$ | 0.001 g |
| $H_2O$ dist. | 1000 g |

To determine the DS content of the water-insoluble fraction (polymer or polymer residues, biomass and inoculum), the total contents of a flask is centrifuged off, washed once in 0.05M phosphate buffer and the insoluble residue is dried for at least 48 hours at 80° C. The biomass and pure inoculum are determined in parallel flasks. The proportion of polymer residue can be calculated by subtracting these experimental quantities.

To measure the biomass, the total contents of a flask are also processed. In this case, a modification of the Lumac-3M adenosine triphosphate (ATP) determination is used: 10 minutes after the addition of reactive reagent (Lumac), 2.5 ml of a 33% strength tetrabutylammonium hydroxide solution are added. This leads to complete release of ATP from all the biomass within 30 seconds. After this time, the ATP contents are determined by the conventional luciferin/luciferase reaction using data from Lumac. To correlate the ATP content with the dry substance, a 24 hour culture of *Kl. planticola*, whose ATP/DS ratio has been previously determined, is also measured.

All samples are designated readily compostable in the sense of the invention if they enable a growth of biomass on the polymers of at least 30 mg/l within a maximum of two weeks under the conditions mentioned above.

Sample which are not compostable in the sense of the invention are those which enable a growth in biomass of at most 15 mg/l within a maximum of two weeks under the conditions mentioned above.

Blown films, fibres and injection moulded articles of any shape can be prepared by known industrial processes from the polyesteramides according to the invention in examples 1 to 6.

1. Polyesteramide from adipic acid, butanediol and aminocaproic acid with an ester portion of 45%

146 g (1 mol) of adipic acid, 90 g (1 mol) of 1,4-butanediol and 131 g (1 mol) of 6-aminocaproic acid are mixed together and heated to 120° C. over the course of 30 min. After 2 hours at this temperature the mixture is heated to 220° C. and a vacuum is applied. Finally, it is polymerised out for 4 hours at 220° C. under an oil pump vacuum. A pale yellow product is obtained which can be granulated. The melting point is 125° C. according to DSC. The relative viscosity (1 wt/% strength in m-cresol at 25° C.) is 2.2.

The molecular weight $M_n$ is 27 000, $M_w$ is 69 700 (measured in m-cresol as solvent, polystyrene calibration).

In the biodegradation test, the material demonstrates a bacterial growth of 90 mg in 14 days.

2. polyesteramide from adipic acid, butanediol and aminocaproic acid with an ester portion of 45 wt. %

146 g (1 mol) of adipic acid, 180 g (2 mol) of 1,4-butanediol and 131 g (1 mol) of 6-aminocaproic acid are mixed together and slowly heated to 170° C. Water begins to be eliminated at this point. The mixture is heated to 220° C., depending on the vigour of distillation, and a vacuum is applied. Finally, it is polymerised out at 240° C. for 4 hours under an oil pump vacuum. A pale yellow product is obtained which can be granulated. The melting point is 127° C. according to DSC. The relative viscosity (1 wt. % in m-cresol at 25° C.) is 2.5.

In the biodegradation test, the material demonstrated a bacterial growth of 60 mg in 14 days.

3. Polyesteramide from adipic acid, butanediol and ε-caprolactam with an ester portion of 50 wt. %

146 g (1 mol) of adipic acid, 90 g (1 mol) of 1,4-butanediol and 200 g (1.77 mol) of caprolactam are mixed together and slowly heated to 170° C. under their inherent pressure in an autoclave. After 3 hours, the pressure is released and water is distilled off. The mixture is heated to 220° C., depending on the vigour of distillation, and a vacuum is applied. Finally, it is polymerised out at 240° C. for 4 hours under an oil pump vacuum. A pale yellow product is obtained which can be granulated. The melting point is 130° C. according to DSC. The relative viscosity (1 wt. % in m-cresol at 25° C.) is 2.9.

In the biodegradation test, the material demonstrates a bacterial growth of 74 mg in 14 days.

4. Polyesteramide from adipic acid, hexanediol and aminocaproic acid with an ester portion of 50 wt. %

146 g (1 mol) of adipic acid, 90 g (1 mol) of 1,4-butanediol and 232 g (1.77 mol) of 6-aminocaproic acid are mixed together and slowly heated to 170° C. Water begins to be eliminated at this point. The mixture is heated to 220° C., depending on the vigour of distillation, and a vacuum is applied. Finally, it is polymerised out for 4 hours at 240° C. under an oil pump vacuum. A pale yellow product is obtained which can be granulated. The melting point is 115° C. according to DSC. The relative viscosity (1 wt. % in m-cresol at 25° C.) is 2.76.

In the biodegradation test, the material demonstrates a bacterial growth of 82 mg in 14 days.

5. Polyesteramide from butanediol and the 1:1 salt from adipic acid and hexamethylenediamine ("AH salt") with an ester portion of 60 wt. %

146 g (1 mol) of adipic acid, 90 g (1 mol) of 1,4-butanediol and 154 g (0.59 mol) of the salt from hexamethylenediamine and adipic acid ("AH salt") are mixed together and slowly heated to 170° C. Water begins to be eliminated at this point. The mixture is heated to 220° C., depending on the vigour of distillation, and a vacuum is applied. Finally, it is polymerised out at 240° C. for 4 hours under an oil pump vacuum. A pale yellow product is obtained which can be granulated. The melting point is 153° C. according to DSC. The relative viscosity (1 wt. % in m-cresol at 25° C.) is 2.85.

In the biodegradation test, the material demonstrates a bacterial growth of 72 mg in 14 days.

6. Polyesteramide from an acid-terminated oligoester made from adipic acid and butanediol and from hexamethylenediamine and ε-caprolactam with an ester portion of 40 wt. %

346 g (1 mol) of an acid-terminated oligoester made from butanediol and adipic acid (SZ 320), 116 g (1 mol) of 1,6-hexamethylenediamine and 72.3 g (0.64 mol) of caprolactam are mixed together and slowly heated to 170° C. under their own pressure in an autoclave. After 3 hours, the pressure is released and water distilled off. The mixture is heated to 220° C., depending on the vigour of distillation, and a vacuum is applied. Finally, it is polymerised out for 4 hours at 240° C. under an oil pump vacuum. A pale yellow product is obtained which can be granulated. The melting point is 123° C. acording to DSC. The relative viscosity (1 wt. % in m-cresol at 25° C.) is 2.8.

In the biodegradation test, the material demonstrates a bacterial growth of 102 mg in 14 days.

Comparison Example 1 (Pure PA 6)

A commercial polyamide 6 with a moderate molecular weight ($\eta_{rel}$ of 2.9 in m-cresol) and a melting point of 220° C. according to DSC demonstrates no degradation at all under the conditions mentioned above.

Comparison Example 2 (Pure Polyester)

146 g (1 mol) of adipic acid and 90 g (1 mol) of 1,4-butanediol are reacted to give a macromolecular polyester. The polymer has a molecular weight ($M_n$) of 12 500 (measured using GPC, polycarbonate calibration). The melting point of the polymer is 52° C. The growth in biomass is 50 mg/g.

Comparison Example 3 (Hot-Melt Adhesive)

A commercial hot-melt adhesive with a melting point of 131° C. according to DSC demonstrates no degradation under the conditions mentioned above.

We claim:

1. A biodegradable, thermoplastically processible copolymer containing aliphatic ester structures and aliphatic amide structures and having a melting point of at least 75° C., the proportion by weight of amide structures being between 70 and 30% and the proportion by weight of ester structures being between 30 and 70%, the copolymer being the reaction product of monomers selected from the group consisting of dialcohols with a chain length of $C_2$–$C_6$, dicarboxylic acids with a chain length of $C_2$–$C_6$ or their salts, hydroxycarboxylic acids and lactones, aminoalcohols, and ε-caprolactam, ω-aminocarboxylic acids with a chain length of $C_4$–$C_6$, and 1:1 salts of dicarboxylic acids with a chain length of $C_4$–$C_6$ and diamines with a chain length of $C_4$–$C_6$.

2. The copolymer of claim 1, which is a copolymer of adipic acid, a dialcohol, and aminocaproic acid or ε-caprolactam.

3. The copolymer of claim 1, wherein the copolymer is a copolymer of adipic acid, a dialcohol, and aminocaproic acid.

4. The copolymer of claim 1, wherein the copolymer is a copolymer of adipic acid, a dialcohol, and ε-caprolactam.

5. The copolymer of claim 1, wherein the copolymer is a copolymer of adipic acid, a dialcohol, and hexamethylene diamine.

6. The copolymer of claim 1, wherein the copolymer is the reaction product of an acid-terminated oligoester of adipic acid and butanediol, hexamethlene diamine, and ε-caprolactam.

7. The copolymer of claim 1, wherein the copolymer is a copolymer of adipic acid, a dialcohol, hexamethylene diamine and caprolactam.

* * * * *